P. M. NORQUEST.
WIND SHIELD FOR MOWING MACHINES.
APPLICATION FILED MAY 16, 1912.
1,065,963.
Patented July 1, 1913.
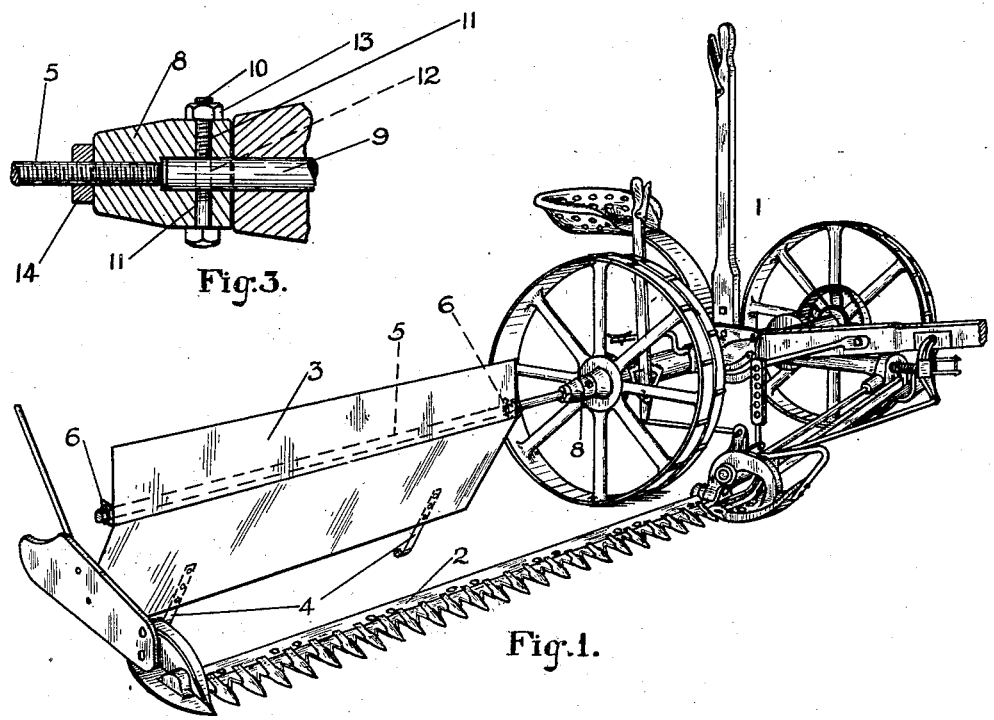
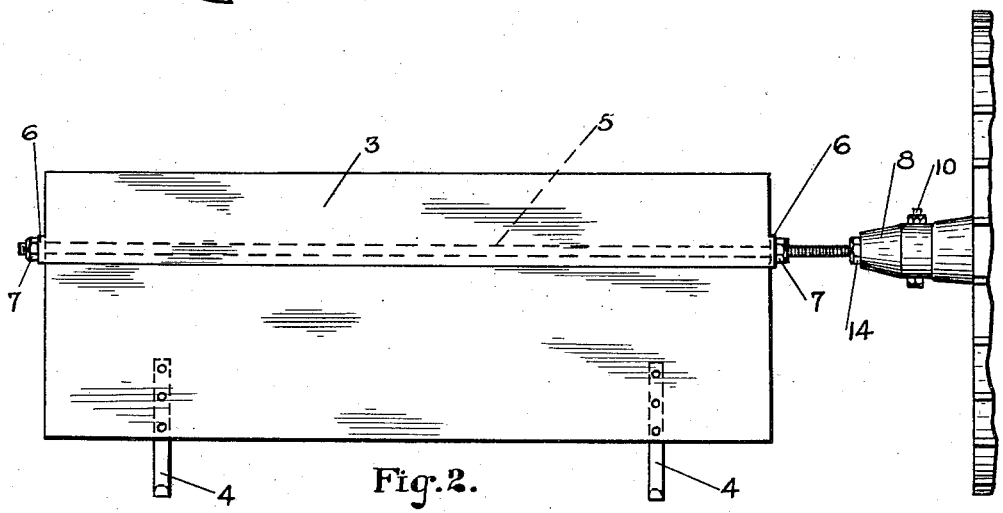
Witnesses.
R. W. Stone
A. A. Olson
Inventor
Peter M. Norquest.
By Joshua R. H. Potts
his Attorney.

UNITED STATES PATENT OFFICE.

PETER M. NORQUEST, OF LINDSBORG, KANSAS.

WIND-SHIELD FOR MOWING-MACHINES.

1,065,963.  Specification of Letters Patent.  Patented July 1, 1913.

Application filed May 16, 1912. Serial No. 697,648.

*To all whom it may concern:*

Be it known that I, PETER M. NORQUEST, a citizen of the United States, and a resident of the city of Lindsborg, county of McPherson, and State of Kansas, have invented certain new and useful Improvements in Wind-Shields for Mowing-Machines, of which the following is a specification.

My invention relates to improvements in wind shields and more specifically to that class thereof designed for use in conjunction with mowing machines.

In the operation of a mowing machine, at the present time, when a strong wind is blowing from the rear, the grass as it is cut by the cutter arm is blown forwardly toward the latter causing the clogging of the recesses in the cutter arm and thereby interfering with the proper operation of the cutter bar.

It is the object of my invention to provide a shield which will be adapted when in use to prevent this forward blowing of the grass and hence to conduce to the better operation of the mowing machine.

A further object is the production of a shield, as mentioned, which will be of simple and economical construction, one which may be readily and easily attached to a mowing machine, and as readily and expeditiously detached when desired, and one which will be of high efficiency in use.

Other objects will appear hereinafter.

With these objects in view the invention consists in the combinations and arrangements of parts hereinafter described and claimed.

The invention will be best understood by reference to the accompanying drawing forming a part of this specification, and in which—

Figure 1 is a perspective view of a conventional mowing machine which is equipped with a wind shield embodying my invention, Fig. 2 is a front elevation of the wind shield, the adjacent portion of the machine to which said shield is connected, being also shown, and Fig. 3 is an enlarged sectional detail showing the connection of the supporting bar of the shield proper with the mowing machine.

Referring now to the drawing a conventional form of mowing machine is shown at 1, the cutter arm 2 thereof being shown projecting laterally from the former. The wind shield is arranged rearwardly of the arm 2 and the same comprises a substantially rectangular body plate 3 of sheet metal. When the shield is in operation, the body 3 is disposed substantially vertically, curved gliders 4 being provided at the lower edge of said member 3 for contact with and riding upon the ground.

The member 3 is pivotally mounted upon a bar 5 which projects laterally from the mowing machine, ears 6 provided at the extremities of the member 3 pivotally embracing said bar, as shown. Nuts 7 threaded upon the bar 5 engage with the ears 6 serving to lock the member 3 against relative longitudinal movement upon the bar 5.

The arm 5 is connected with the mowing machine through the medium of a cap 8 which is adapted for arrangement upon the adjacent end of the axle 9 of the mower. The cap 8 is detachably secured to the axle 9 by means of a bolt 10 which passes through diametric openings 11 provided in the inner end of said cap, and a registering transversely extending opening 12 provided in said axle, a nut 13 threaded upon said bolt serving to lock the latter in position. The opening 12 in the axle is ordinarily engaged by a cotter pin which serves to lock the adjacent wheel in position upon the axle, this cotter pin, when the shield is attached to the mower being removed. The adjacent end of the bar 5 is threaded in the outer end of the cap 8, a lock nut 14 threaded upon said bar for abutment against the adjacent end of said cap serving evidently to lock the bar 5 against relative movement in said cap when the device is properly adjusted. The shield is thus detachably connected with the mower so that in calm weather, the same may be readily and quickly detached and stored for use in windy weather, when the same may be as readily and expeditiously attached.

The body 3, when the device is in use, will evidently serve to break any wind blowing from the rear and thereby prevent any disturbance of the grass as it is cut by the cutter arm. The member 3 is mounted upon the supporting bar 5 above the center of the former so that the same will normally assume a vertical position. The lower edge portion of said member 3 is inclined rearwardly so that the impingement of the wind thereon cannot cause the rocking thereof forwardly to inoperative position, the engagement of the gliders 4 with the ground, by reason of this disposition of the lower edge portion of said member 3, being such that forward rocking of the lower edge of the member 3 will simply cause said gliders to be forced into closer engagement with the ground.

The device is simple and economical in construction and hence, may be manufactured at a low cost, and the same will be found effectual and efficient in use.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having described my invention what I claim as new and desire to secure by Letters Patent is:

1. A wind shield for mowing machines and the like, comprising a supporting bar; a shield supported on said bar with its lower edge in close proximity to the ground; and gliders secured on the lower edge of said shield adapted to contact with the ground, substantially as described.

2. A wind shield for mowing machines and the like, comprising a supporting bar; a shield supported on said bar with its lower edge in close proximity to the ground, said shield being angular in cross section, and the lower portion thereof being inclined rearwardly; and gliders secured on the lower edge of said shield adapted to contact with the ground, substantially as described.

3. A wind shield for mowing machines and the like, comprising a supporting bar; and a shield supported on said bar with its lower edge in close proximity to the ground, said shield being angular in cross section, and the lower portion thereof being inclined rearwardly, substantially as described.

4. The combination with a mowing machine having an axle of a supporting bar; means for detachably securing said bar to the end of said axle; and a wind shield supported on said bar, substantially as described.

5. The combination with a mowing machine having an axle of a supporting bar; a cap at one end of said bar arranged to embrace the end of said axle and secure said bar thereto; and a wind shield supported on said bar, substantially as described.

In testimony whereof I have signed my name to this specification in the presence of two subscribing witnesses.

PETER M. NORQUEST.

Witnesses:
 EBBA FORNBERG,
 ELMER E. PETERSON.

Copies of this patent may be obtained for five cents each, by addressing the "Commissioner of Patents, Washington, D. C."